United States Patent
Boonie et al.

(10) Patent No.: US 6,330,612 B1
(45) Date of Patent: Dec. 11, 2001

(54) METHOD AND APPARATUS FOR SERIALIZING ACCESS TO A SHARED RESOURCE IN AN INFORMATION HANDLING SYSTEM

(75) Inventors: Mark A. Boonie, Hopewell Junction; Peter G. Sutton, LaGrangeville; Wendell W. Wilkinson, Hyde Park; Phil Chi-Chung Yeh, Poughkeepsie, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/141,900

(22) Filed: Aug. 28, 1998

(51) Int. Cl.[7] .................................................. G06F 13/00
(52) U.S. Cl. ........................................... 709/229; 709/104
(58) Field of Search .................................. 709/200, 201, 709/202, 210, 217, 218, 219, 224, 225, 226, 102, 104

(56) References Cited

U.S. PATENT DOCUMENTS

| | | | |
|---|---|---|---|
| 4,965,719 | * 10/1990 | Shoens et al. | 711/100 |
| 5,734,909 | * 3/1998 | Bennett | 709/229 |
| 5,805,900 | * 9/1998 | Fagen et al. | 710/220 |
| 5,875,342 | * 2/1999 | Temple | 710/260 |
| 5,937,199 | * 8/1999 | Temple | 710/262 |
| 6,105,049 | * 8/2000 | Govindaraju et al. | 709/102 |
| 6,105,050 | * 8/2000 | Govindaraju et al. | 709/102 |
| 6,112,222 | * 8/2000 | Govindaraju et al. | 709/102 |
| 6,178,421 | * 1/2001 | Dahlen et al. | 709/400 |
| 6,185,562 | * 2/2001 | Dahlen et al. | 707/8 |

* cited by examiner

*Primary Examiner*—Moustafa M. Meky
(74) *Attorney, Agent, or Firm*—William A. Kinnaman, Jr.

(57) ABSTRACT

A method and apparatus for serializing access by n entities to a shared resource in an information handling system. A waiter list is defined as a circular list of n bits, each of which is assigned to an entity. When a bit is false (0) it indicates that the corresponding entity is not waiting for the lock; when the bit is true (1) it indicates the corresponding entity is waiting for the lock. A next waiter indicator (NWI) is also defined that contains a value from 0 to n inclusive; a value of 0 indicates that there are currently no waiters, while a value from 1 to n indicates the next waiter to whom the lock will be granted. The waiter list is initialized to zeros to indicate there are no waiters. When an entity requests a lock that cannot be granted, the entity is made a waiter by setting the corresponding bit in the waiter list to one. If the next waiter indicator is zero, indicating that there were previously no waiters for the lock, the indicator is set to identify the requesting entity as the next waiter. When a lock is released and there is a next waiter for the lock as indicated by the next waiter indicator, that waiter is made a lock holder and the corresponding bit in the waiter list is reset to indicate that the entity is no longer a waiter for the lock. A new next waiter is then found by scanning the waiter list beginning with the entry following that for the entity granted access to the resource. This ensures that once a waiter releases a lock, the waiter is not selected to receive the lock again until all other waiters have received the lock.

21 Claims, 3 Drawing Sheets

METHOD AND APPARATUS FOR SERIALIZING ACCESS TO A SHARED RESOURCE IN AN INFORMATION HANDLING SYSTEM

BACKGROUND OF THE INVENTION

1. Field of the Invention

This invention relates to a method and apparatus for serializing access to a shared resource in an information handling system and, more particularly, to a method and apparatus for serializing access by a plurality of entities such as processors, processes or users to such a shared resource.

2. Description of the Related Art

In information handling systems, processors, applications or other entities frequently must access shared resources (files, memory regions and the like) that are potentially being simultaneously accessed by another entity. Such systems conventionally use lock managers to serialize access to a resource, ensuring that only a single entity accesses a resource at any one time. Such lock managers typically use a resource serialization variable (RSV) that is atomically tested and set to acquire a lock on the resource for the requester. Various instructions are available for implementing such atomic operations, such as Test and Set (TS), Compare and Swap (CS) and Compare Double and Swap (CDS) in an IBM S/390® environment.

In a lock manager that allows queuing of lock requests, an efficient mechanism is needed to ensure that queued waiters are given fair access to the lock. If a list of waiters is kept in the order in which they requested the lock, then the lock manager can do one of several things. First, it can preallocate storage for a maximum number of waiters. However, in systems with low contention, this wastes large amounts of storage. Second, a lock manager can allocate storage for each waiter as each request arrives. This has a tendency to fragment storage, though, reducing the effectiveness of the lock manager. What is desired, therefore, is a lock manager that conserves storage, as well as one that does not fragment storage.

BRIEF SUMMARY OF THE INVENTION

In general, the present invention contemplates a method and apparatus for serializing access by a plurality of entities to a shared resource in an information handling system in which there is defined a circular waiter list containing a plurality of entries, each of which corresponds to one of the entities and indicates whether the corresponding entity is a waiter for the resource, as well as a next waiter indicator (NWI) identifying one of the entities as a next waiter for the resource. Upon release of the resource by an entity previously accessing the resource, the lock manager grants access to the entity identified as a next waiter by the next waiter indicator and determines a new next waiter by scanning the entries in the waiter list beginning with the entry following that for the entity granted access to the resource.

The use of a next waiter indicator allows the lock to be granted in a fair manner while avoiding both storage fragmentation and wasted storage. The present invention, which uses the next waiter indicator, exhibits several desirable properties. In a system with low contention (i.e., never more than two waiters), the lock is always granted to waiters in the order in which the lock requests were received, since there is only one waiter other than the next waiter. In all cases, since a new next waiter is determined by scanning the entries in the waiter list beginning with the entry following that for the previous next waiter, no waiter can obtain the lock twice while other waiters have yet to receive the lock for a first time; this ensures fair access.

Further, since storage need be allocated only for the next waiter indicator and waiter list, storage utilization is minimized. Since these structures are fixed in size, fragmentation is avoided.

DETAILED DESCRIPTION OF THE INVENTION

Figure 1:
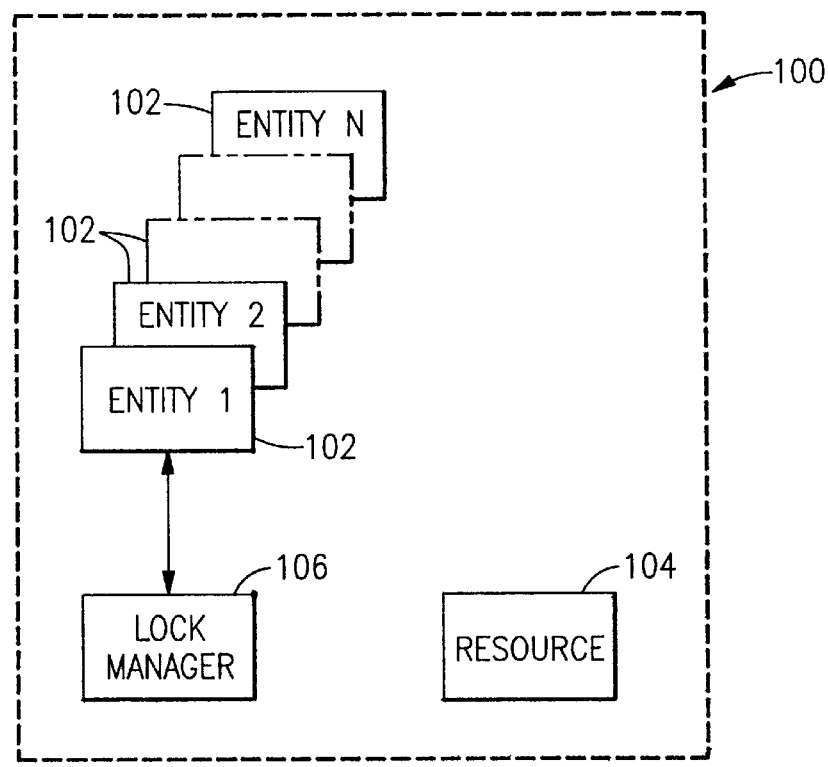
FIG. 1 is a schematic block diagram of a computer system incorporating the present invention.

FIG. 1 is a schematic block diagram of a computer system 100 incorporating the present invention. Computer system 100 may be either a single physical machine or a complex of interconnected machines or systems. As shown in the figure, computer system 100 contains a plurality of entities 102 (n entities in this particular example) that may have occasion to access a shared resource 104. Entities 102 may represent processors, processes, users, or the like; their exact nature is immaterial to the present invention. Resource 104 may comprise a file, a record, a memory region or the like that a particular entity 102 wishes to access; again, its exact nature is immaterial.

A lock manager 106 constructed in accordance with the present invention serializes accesses by entities 102 to resource 104 to ensure that only one entity can access the resource at a time. Lock manager 106 may be implemented as hardware (including microcode), software or some combination of the two.

Figure 2:
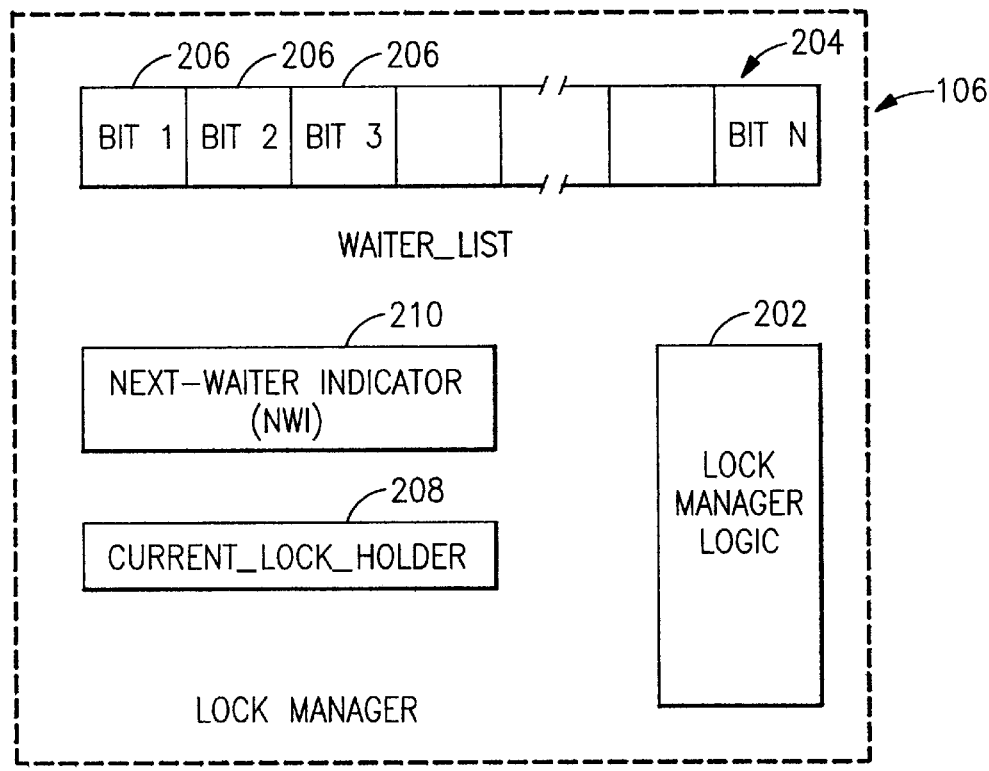
FIG. 2 is a schematic block diagram of the lock manager of the computer system shown in FIG. 1.

Referring to FIG. 2, lock manager 106 comprises lock manager logic 202, hardware or software that, in accordance with the present invention, uses a plurality of stored data structures to accomplish this serialization. These data structures include a waiter list 204 (waiter_list) defined as a circular list of n bits 206 (where n is the number of entities 102), with each bit 206 being assigned to an entity 102. When a bit 206 is FALSE (i.e., zero), it indicates that the corresponding entity 102 is not waiting for the lock; when the bit 206 is TRUE (i.e., one), it indicates the corresponding entity 102 is waiting for the lock. Initially, all bits 206 in the list 204 are set to zeros to indicate that there are no waiters 102.

A current lock holder indicator 208 (current_lock_holder) indicates the entity 102 (if any) currently holding a lock on the resource 104. Current lock holder indicator 208, which is in effect the "lock" that is managed by lock manager 106, may be implemented in any one of a number of ways that are not part of the present invention. Thus, current lock holder 208 may contain a value from 0 to n inclusive, where a value of 0 indicates that no entity 102 currently holds a lock on the resource 104 and a value from 1 to n indicates that the corresponding entity 102 holds a lock on the resource 104. This implementation could be used where, as assumed here, each entity 102 accesses resource 104 on an exclusive basis, so that only one entity 102 could be accessing the resource 104 a given time.

Alternatively, the current lock holder indicator 208 may be implemented as a list of n bits, each associated with a particular entity 102 and indicating whether the entity holds a lock on the resource 104. This latter implementation would be used, for example, if entities 102 accessed the resource 104 on an exclusive or shared basis, so that more than one entity 102 could be accessing the resource 104 (on a shared basis) at a given time.

Finally, and in accordance with the present invention, a next waiter indicator (NWI) 210 contains a value from 0 to n inclusive; a value of 0 indicates that there are currently no waiters 102, while a value from 1 to n indicates the next waiter 102 to whom the lock will be granted.

Figure 3:
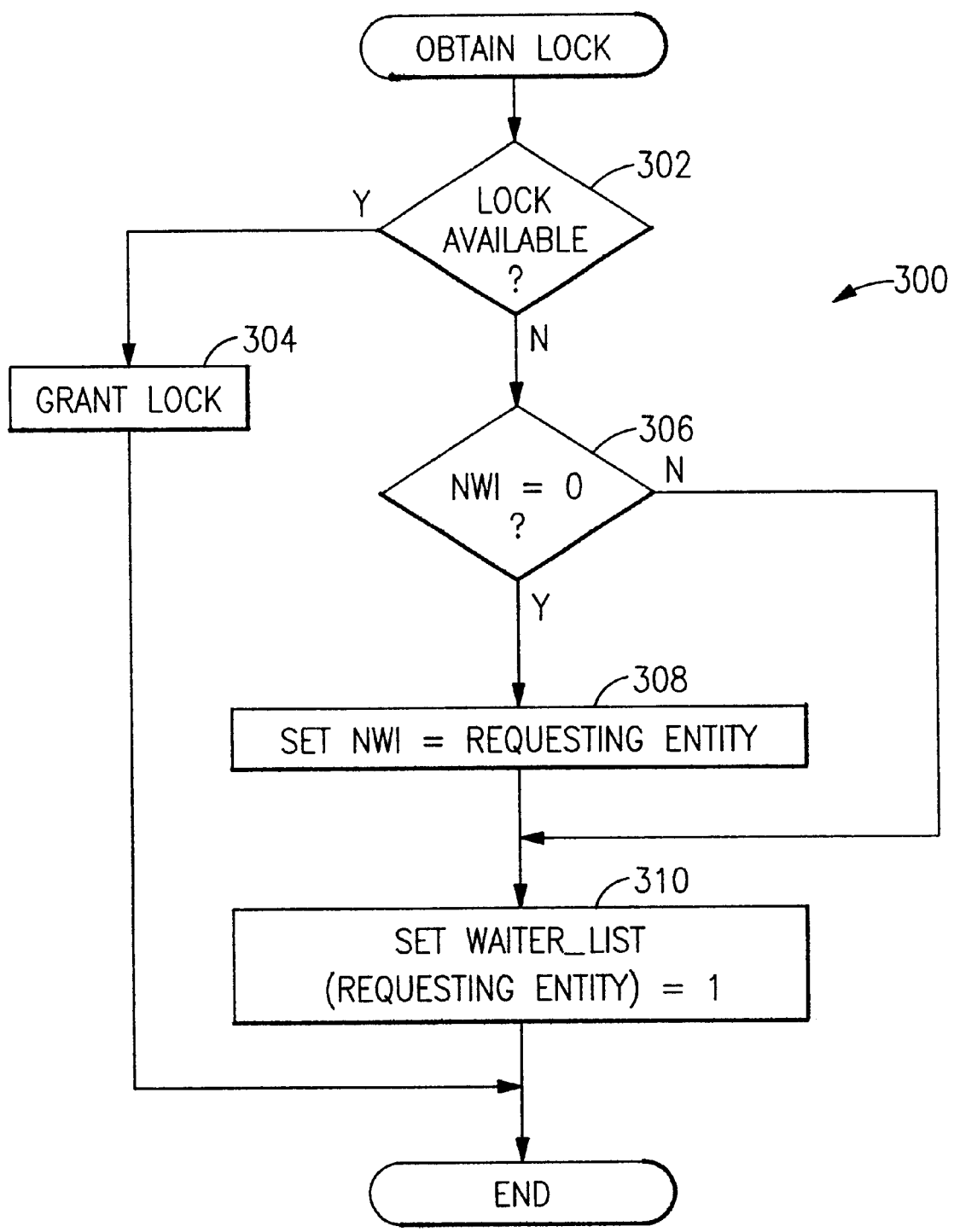
FIG. 3 is a schematic block diagram of the procedure for acquiring a lock as performed by the lock manager shown in FIG. 2.

FIG. 3 shows the procedure 300 for acquiring a lock as performed by the lock manager 106. Procedure 300 is invoked upon receiving a request from an entity 102 to obtain a lock for the resource 104. Referring to the figure, upon receiving a lock request, lock manager 106 first determines whether the lock is currently available by checking the current lock holder indicator 208 to see if it is zero (step 302). If the lock is currently available, the lock manager 106 grants the lock (step 304). This is done by setting the current lock holder indicator 208 equal to the index of the requesting entity 102 if the indicator is a single value or by setting the appropriate bit of the current lock holder indicator if it is a bit list.

If, on the other hand, the lock is currently unavailable, the lock manager 106 makes the requesting entity 102 a waiter and, if there was previously no waiter, the next waiter as well. As represented by pseudocode, the following processing is performed for a requesting entity a:

A01  If NWI=0 then NWI=a
A02  waiter_list[a]=TRUE

This processing is also shown as steps 306–308 in FIG. 3. Thus, if the lock is currently unavailable, the lock manager 106 tests the next waiter indicator (NWI) 210 to determine whether there is any other waiter 102 for the resource (step 306 ). If there is no other waiter (as indicated by NWI=0), the lock manager sets the next waiter indicator 210 equal to the index number of the requesting entity 102 to indicate that the requesting entity 102 is now the next waiter (step 308); otherwise (i.e., if NMI>0), the lock manager 106 leaves the next waiter indicator 210 unchanged. Regardless of whether the next waiter indicator 210 is changed, lock manager 106 sets the bit 206 in the circular list 204 corresponding to the requesting entity 102 equal to one to indicate that the requesting entity 102 is a waiter (step 310 ).

Although not shown in FIG. 3, before exiting the procedure 300 lock manager 106 may also notify the requesting entity 102 of the results of the lock request (i.e., whether it is granted a lock or instead made a waiter), as is conventional in the art.

Figure 4:
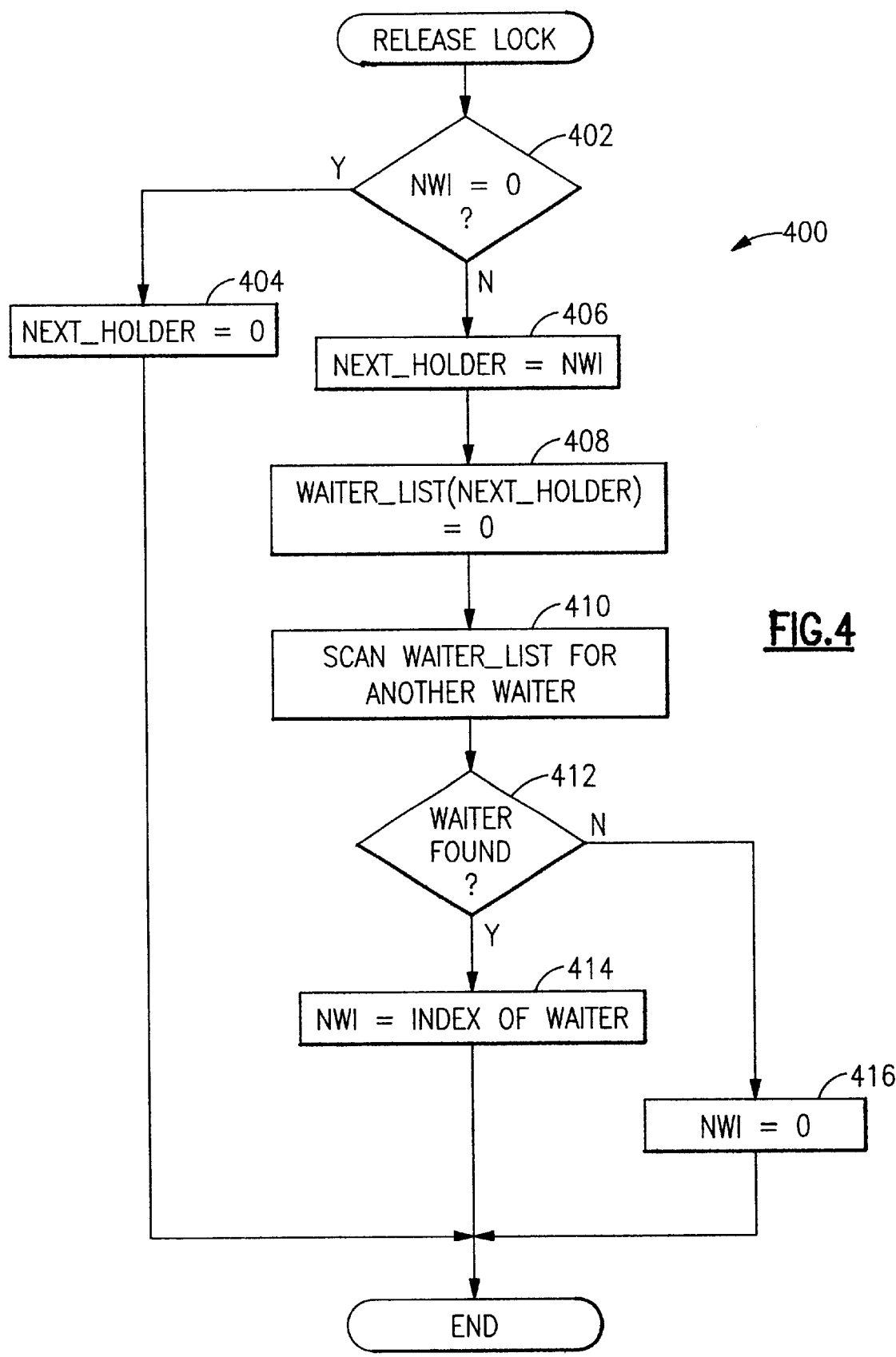
FIG. 4 is a schematic block diagram of the procedure for releasing a lock as performed by the lock manager shown in FIG. 2.

FIG. 4 shows the procedure 400 followed by the lock manager 106 when a lock is released to determine the next entity (if any) to whom the lock should be granted. This procedure is also shown in the following pseudocode listing:

```
B01    If NWI = 0 then next_holder = 0
B02    Else Do
B03        next_holder = NWI
B04        waiter_list[next_holder] = FALSE
B05        NWI = 0
B06        found = FALSE
B07        Do i = 1 to n While found = FALSE
B08            index = NWI + i
B09            If index > n then index = index − n
B10            If waiter_list[index] = TRUE then Do
B11                NWI = index
B12                found = TRUE
B13            End
B14        End
B15    End
```

In the above listing, next_holder identifies the next entity 102 to which the lock is granted. If next_holder is zero, that signifies that there is no such next entity 102.

Referring to FIG. 4, upon receiving a request from a entity 102 to release a lock on the resource 104, lock manager 106 checks the next waiter indicator 210 to determine whether there is any waiter 102 for the resource 104 (step 402). If there is no waiter 102 for the resource 104 (as indicated by NWI=0), then the lock manager 106 sets next_holder 212 equal to zero to indicate that there is no next holder of the lock for the resource 104 (step 404).

If, on the other hand, there is a next waiter 102 for the resource 104 (as indicated by NWI>0), then the lock manager 106 sets the next holder indicator 212 equal to NWI to indicate that the corresponding entity 102 is the next holder of the lock for the resource 104 (step 406). The lock manager 106 thereafter resets the corresponding bit 206 in the waiter list 204 to zero to indicate that the corresponding entity 102 is no longer a waiter for the resource 104 (step 408).

The update to next_holder at step 404 or 406 is propagated to the current lock holder indicator 208 (a scalar value or a bit list, depending on implementation) to update the lock state, and the new lock owner (if any) is notified.

The lock manager 106 then seeks a new first waiter 102 by sequentially scanning the bits 206 in the waiter list 204 for a waiter (as indicated by a bit value of one), beginning with the index location immediately following that of the previous next waiter 102 (now a next holder) and continuing until all of the locations 206 have been scanned or a waiter 102 has been found (step 410). Since list 204 is defined as a circular list, for this purpose location 1 follows location n. If a waiter 102 is found (step 412), the next waiter index 210 is set to the index of the newly found waiter 102 (step 414). On the other hand, if all of the bit locations 206 have been scanned and no waiter 102 is found, the next waiter indicator 210 is set to zero, as there is no next waiter (step 416). (Step 416 is shown at the end of the procedure 400 for convenience of exposition. In actuality, as shown in the above pseudocode listing, NWI may be initialized to 0 before the scan and then updated to a nonzero value if another waiter is found.)

As evident from the above description, when a waiter 102 is selected via NWI for having the lock granted to it, the next waiter that is indicated by NWI is located by searching the waiter list 204 beginning with the location 206 immediately following the previous NWI value. This ensures that once a waiter 102 releases a lock, the waiter is not selected to receive the lock again until all other waiters have received the lock.

The procedure can be modified to handle a combination of shared waiters and exclusive waiters. This is done by determining if the NWI waiter is requesting a shared lock or an exclusive lock. If the waiter is requesting an exclusive lock, then processing is identical to that described above. If the waiter is requesting a shared lock, then the above processing is performed repeatedly, granting access to the waiter indicated by NWI until either there are no more waiters or until the next waiter is requesting an exclusive lock.

What is claimed is:

1. A method of serializing access by a plurality of entities to a shared resource in an information handling system, comprising the steps of:
    (a) storing a circular waiter list containing a plurality of entries, each of which corresponds to one of the entities and contains a value indicating whether the corresponding entity is a waiter for the resource;
    (b) storing a next waiter indicator identifying one of the entities as a next waiter for the resource; and
    (c) upon release of the resource by an entity previously accessing the resource:
        (1) granting access to the entity identified as a next waiter by the next waiter indicator; and
        (2) determining a new next waiter by scanning the entries in the waiter list beginning with the entry following that for the entity granted access to the resource.

2. The method of claim 1, comprising the further step of:
    (d) in response to a request from one of the entities for access to the resource, if the resource is not currently available:
        (1) modifying the entry in the waiter list corresponding to the requesting entity to indicate that the requesting entity is a waiter for the resource;
        (2) examining the next waiter indicator to determine whether any entity is a next waiter for the resource; and
        (3) if no entity is a next waiter for the resource, modifying the next waiter indicator to indicate that the requesting entity is a next waiter for the resource.

3. The method of claim 1 in which step (c)(1) comprises the steps of:
    (A) examining the next waiter indicator to determine whether any entity is a next waiter for the resource; and
    (B) if any entity is a next waiter for the resource, granting that entity access to the resource.

4. The method of claim 3 in which step (c)(1) further comprises the step of:
    (C) modifying the entry in the waiter list corresponding to the entity to indicate that the entity is no longer a waiter for the resource.

5. The method of claim 1 in which step (c)(2) comprises the steps of:
    (A) scanning the waiter list to determine whether any other entity is a waiter for the resource; and
    (B) upon finding an entry in the waiter list corresponding to a waiter for the resource, modifying the next waiter indicator to indicate that the entity corresponding to the entry is a next waiter for the resource.

6. The method of claim 5 in which step (c)(2) comprises the further step of:
    (C) upon finding no entry in the waiter list corresponding to a waiter for the resource, modifying the next waiter indicator to indicate that no entity is a next waiter for the resource.

7. The method of claim 1 in which each of said entries indicates when containing a first value that the corresponding entity is not waiting for the resource and indicates when containing a second value that the corresponding entity is waiting for the resource.

8. Apparatus for serializing access by a plurality of entities to a shared resource in an information handling system, comprising:
    (a) means for storing a circular waiter list containing a plurality of entries, each of which corresponds to one of the entities and contains a value indicating whether the corresponding entity is a waiter for the resource;
    (b) means for storing a next waiter indicator identifying one of the entities as a next waiter for the resource; and
    (c) means responsive to release of the resource by an entity previously accessing the resource for: (1) granting access to the entity identified as a next waiter by the next waiter indicator; and (2) determining a new next waiter by scanning the entries in the waiter list beginning with the entry following that for the entity granted access to the resource.

9. The apparatus of claim 8, further comprising:
    (d) means responsive to a request from one of the entities for access to the resource if the resource is not currently available for: (1) modifying the entry in the waiter list corresponding to the requesting entity to indicate that the requesting entity is a waiter for the resource; (2) examining the next waiter indicator to determine whether any entity is a next waiter for the resource; and (3) if no entity is a next waiter for the resource, modifying the next waiter indicator to indicate that the requesting entity is a next waiter for the resource.

10. The apparatus of claim 8 in which the means (c)(1) comprises:
    (A) means for examining the next waiter indicator to determine whether any entity is a next waiter for the resource; and
    (B) means for granting an entity access to the resource if the entity is a next waiter for the resource.

11. The apparatus of claim 8 in which the means (c)(1) further comprises:
    (C) means for modifying the entry in the waiter list corresponding to the entity to indicate that the entity is no longer a waiter for the resource.

12. The apparatus of claim 8 in which the means (c)(2) comprises:
    (A) means for scanning the waiter list to determine whether any other entity is a waiter for the resource; and
    (B) means operable upon finding an entry in the waiter list corresponding to a waiter for the resource for modifying the next waiter indicator to indicate that the entity corresponding to the entry is a next waiter for the resource.

13. The apparatus of claim 12 in which the means (c)(2) further comprises:
    (C) means operable upon finding no entry in the waiter list corresponding to a waiter for the resource for modifying the next waiter indicator to indicate that no entity is a next waiter for the resource.

14. The apparatus of claim 8 in which each of said entries indicates when containing a first value that the corresponding entity is not waiting for the resource and indicates when containing a second value that the corresponding entity is waiting for the resource.

15. A program storage device readable by a machine, tangibly embodying a program of instructions executable by the machine to perform method steps for serializing access by a plurality of entities to a shared resource in an information handling system, the method steps comprising:

(a) storing a circular waiter list containing a plurality of entries, each of which corresponds to one of the entities and contains a value indicating whether the corresponding entity is a waiter for the resource;

(b) storing a next waiter indicator identifying one of the entities as a next waiter for the resource; and (c) upon release of the resource by an entity previously accessing the resource:
   (1) granting access to the entity identified as a next waiter by the next waiter indicator; and
   (2) determining a new next waiter by scanning the entries in the waiter list beginning with the entry following that for the entity granted access to the resource.

16. The program storage device of claim 15, the method steps further comprising:

(d) in response to a request from one of the entities for access to the resource, if the resource is not currently available:
   (1) modifying the entry in the waiter list corresponding to the requesting entity to indicate that the requesting entity is a waiter for the resource;
   (2) examining the next waiter indicator to determine whether any entity is a next waiter for the resource; and
   (3) if no entity is a next waiter for the resource, modifying the next waiter indicator to indicate that the requesting entity is a next waiter for the resource.

17. The program storage device of claim 15 in which step (c)(1) comprises the steps of:

(A) examining the next waiter indicator to determine whether any entity is a next waiter for the resource; and (B) if any entity is a next waiter for the resource, granting that entity access to the resource.

18. The program storage device of claim 17 in which step (c)(1) further comprises the step of:

(C) modifying the entry in the waiter list corresponding to the entity to indicate that the entity is no longer a waiter for the resource.

19. The program storage device of claim 15 in which step (c)(2) comprises the steps of:

(A) scanning the waiter list to determine whether any other entity is a waiter for the resource; and (B) upon finding an entry in the waiter list corresponding to a waiter for the resource, modifying the next waiter indicator to indicate that the entity corresponding to the entry is a next waiter for the resource.

20. The program storage device of claim 19 in which step (c)(2) comprises the further step of:

(C) upon finding no entry in the waiter list corresponding to a waiter for the resource, modifying the next waiter indicator to indicate that no entity is a next waiter for the resource.

21. The program storage device of claim 15 in which each of said entries indicates when containing a first value that the corresponding entity is not waiting for the resource and indicates when containing a second value that the corresponding entity is waiting for the resource.

* * * * *